United States Patent
Osborne

[11] Patent Number: 6,067,824
[45] Date of Patent: May 30, 2000

[54] AUTOMOBILE IGNITION SECURITY SYSTEM USING A DIFFERENTIAL MAGNETIC COMPARATOR

[75] Inventor: Thomas G. Osborne, Highland Village, Tex.

[73] Assignee: Optek Technology, Inc., Carrollton, Tex.

[21] Appl. No.: 09/182,748

[22] Filed: Oct. 29, 1998

[51] Int. Cl.[7] .................................................. B60R 25/04
[52] U.S. Cl. ............................................. 70/252; 70/276
[58] Field of Search ............................. 70/276, 186, 252, 70/413

[56] References Cited

U.S. PATENT DOCUMENTS

| | | | |
|---|---|---|---|
| 2,767,278 | 10/1956 | Collins | 70/276 |
| 4,399,673 | 8/1983 | Gotanda | 70/276 |
| 4,518,918 | 5/1985 | Avery | 324/208 |
| 4,692,702 | 9/1987 | Hüschelrath et al. | 324/251 |
| 4,745,363 | 5/1988 | Carr et al. | 324/208 |
| 4,935,698 | 6/1990 | Kawaji et al. | 324/207.2 |
| 5,045,920 | 9/1991 | Vig et al. | 357/74 |
| 5,084,674 | 1/1992 | Lachmann et al. | 324/174 |
| 5,115,194 | 5/1992 | Luetzow et al. | 324/207.2 |
| 5,192,877 | 3/1993 | Bittebierre et al. | 307/309 |
| 5,202,580 | 4/1993 | Janssen | 70/276 X |
| 5,241,267 | 8/1993 | Gleixner et al. | 324/207.2 |
| 5,321,355 | 6/1994 | Luetzow | 324/207.2 |
| 5,451,868 | 9/1995 | Lock | 324/173 |
| 5,551,267 | 9/1996 | Janssen et al. | 70/276 X |
| 5,614,821 | 3/1997 | Leiderer | 324/174 |
| 5,682,095 | 10/1997 | Mathes et al. | 324/174 |
| 5,694,040 | 12/1997 | Plagens | 324/207.2 |
| 5,862,691 | 1/1999 | Friedrich et al. | 70/276 X |
| 5,865,049 | 2/1999 | Friedrich et al. | 70/276 X |
| 5,878,610 | 3/1999 | Friedrich | 70/276 X |
| 5,890,384 | 4/1999 | Bartel et al. | 70/276 X |

FOREIGN PATENT DOCUMENTS

| | | | |
|---|---|---|---|
| 2724025 | 12/1977 | Germany | 70/276 |
| 3941086 | 6/1991 | Germany | 70/276 |
| WO 90/07045 | 6/1990 | WIPO | 70/276 |

*Primary Examiner*—Lloyd A. Gall
*Attorney, Agent, or Firm*—Locke Liddell & Sapp LLP

[57] ABSTRACT

A lock for an automobile ignition system includes a sleeve having a cylindrical inner surface. A lock cylinder is provided which is rotatably mounted within the sleeve and has a cylindrical outer surface defining a cylindrical interface with the inner surface of the sleeve. The cylinder includes a keyway adapted for receiving a key used to rotate the cylinder between an off and start position. A differential magnetic comparator having a pair of magnetically sensitive areas is mounted on the sleeve for detecting when the cylinder is rotated to the start position to generate an ignition signal. A magnet is mounted to the cylinder interface for generating a magnetic flux and for activating the comparator when the cylinder is rotated to the start position. A difference in the magnetic flux density present on the pair of magnetically sensitive areas causes the comparator to generate the ignition signal. However, in the presence of a magnet external to the lock, the magnetically sensitive areas detect no difference in magnetic flux density which prevents the comparator from generating the ignition signal.

2 Claims, 1 Drawing Sheet

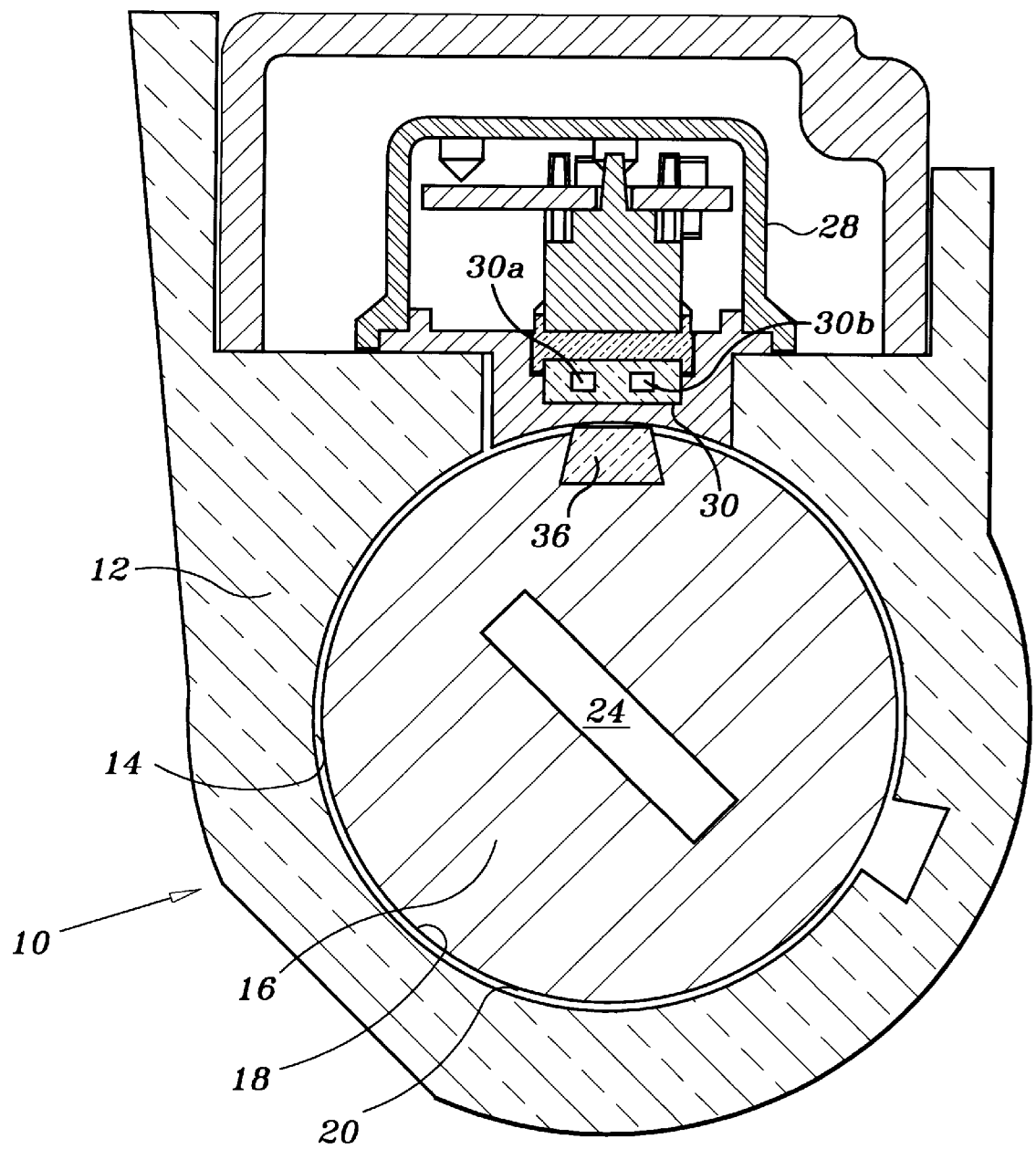

AUTOMOBILE IGNITION SECURITY SYSTEM USING A DIFFERENTIAL MAGNETIC COMPARATOR

TECHNICAL FIELD OF THE INVENTION

The present invention relates to automobile ignition locks, and more particularly to an ignition security system utilizing a differential magnetic comparator.

BACKGROUND OF THE INVENTION

Automobile ignition security systems may utilize a Hall-effect magnetic sensor which contains a single Hall-effect element located in the ignition switch lock assembly to generate a specific voltage code. This code is utilized by a microprocessor of the ignition system of the vehicle to start the automobile. The Hall-effect sensor is located in the lock sleeve and is activated by a magnet located in the lock cylinder. The magnet in the lock cylinder provides a magnetic flux that is necessary to turn on the Hall-effect sensor. During normal operation, the magnet is rotated past the Hall-effect sensor and the output voltage of the Hall-effect sensor changes from a high level to a low level resulting in a set voltage at the output of the Hall-effect sensor. The output is latched and remains low when the magnet is rotated past the Hall-effect sensor, and the magnetic flux density decreases to a level below that which is necessary to turn on the Hall-effect sensor.

Ignition security systems may further include an additional Hall-effect sensor, that contains a single Hall-effect element which is used to detect an external magnetic field. This additional Hall-effect element is utilized as an anti-theft mechanism to deter unauthorized use of automobiles. The additional Hall-effect sensor turns on before the main Hall-effect sensor turns on thereby sending an improper voltage code to the microprocessor of the ignition system of the vehicle to prevent the vehicle from starting. The use of two Hall-effect sensors provides for an ignition security system; however, there remains a need for an improved ignition security system that provides a reliable, low cost anti-theft and/or tampering mechanism for automobile ignition security systems.

SUMMARY OF THE INVENTION

In accordance with the present invention, a lock for an automobile ignition system is provided. The lock includes a sleeve having a cylindrical inner surface. A lock cylinder is provided which is rotatably mounted within the sleeve and has a cylindrical outer surface defining a cylindrical interface with the inner surface of the sleeve. The cylinder includes a keyway adapted for receiving a key used to rotate the cylinder between off and start positions. A differential magnetic comparator having a pair of magnetically sensitive areas is mounted on the sleeve for detecting when the cylinder is rotated to the start position to generate an ignition signal. A magnet is mounted to the cylinder interface for generating a magnetic flux and for activating the comparator when the cylinder is rotated to the start position. A difference in the magnetic flux density present on the pair of magnetically sensitive areas causes the comparator to generate the ignition signal. However, in the presence of a magnet external to the lock, the magnetically sensitive areas detect no difference in magnetic flux density which prevents the comparator from generating the ignition signal.

BRIEF DESCRIPTION OF THE DRAWINGS

For a more complete understanding of the present invention and for further advantages thereof, reference is now made to the following Description of the Preferred Embodiments taken in conjunction with the accompanying Drawings which is a sectional view of the present lock.

DESCRIPTION OF THE PREFERRED EMBODIMENTS

Referring to the Figure, a lock for an automobile ignition system in accordance with the present invention is illustrated, and is generally identified by the numeral 10. Lock 10 includes a hollow cylindrical sleeve 12 having a cylindrical inner surface 14. Lock 10 further includes a lock cylinder 16 which is rotatably mounted within sleeve 12 and has a cylindrical outer surface 18, defining a cylindrical interface 20 with the inner surface 14 of sleeve 12. Lock cylinder 16 includes a keyway 24 adapted to receive a key (not shown) used to rotate cylinder 16 between an off position and a start position.

Mounted within a housing 28 disposed on sleeve 12 is a differential magnetic comparator 30. Comparator 30 includes a pair of magnetically sensitive areas 30a and 30b mounted on sleeve 12 for detecting when cylinder 16 is rotated to the start position. Magnetically sensitive areas are located in close proximity to each other, for example, about 0.060 inches apart. The output of the comparator 30 generates an ignition signal for transmission to a microprocessor of the automobile ignition system to actuate the vehicle.

Comparator 30 may comprise, for example, a Hall-effect sensor such as, for example, a differential magnetic sensor, type OHN3056 manufactured and sold by Optek Technology, Inc. of Carrollton, Tex. Such a device includes an integrated circuit having two Hall-effect sensing elements spaced approximately 0.088 inches apart. The Hall-effect sensing elements are connected to two separate linear amplifiers whose outputs are connected to a differential amplifier. The output of the differential amplifier represents only the difference in magnetic flux density between the two Hall-effect sensing elements. The output of the differential amplifier is coupled to a threshold detector, and when the difference in the magnetic flux density exceeds the threshold, the logic output of the sensor changes state. Additional differential magnetic comparators are described in U.S. Pat. Nos. 4,518,918; 5,192,877; and 5,241,267, whose disclosures and drawings are incorporated herein by reference.

Mounted to lock cylinder 16 and adjacent to cylinder interface 20 is a magnet 36 for generating a magnetic flux and activating comparator 30 when cylinder 16 is rotated to the start position. During normal operation, magnet 36 is rotated past comparator 30, and when the difference in the magnetic flux density present on the two magnetically sensitive areas of comparator 30 is sufficient, the output of comparator 30 is latched to a low level resulting in a set voltage at the output of the Hall-effect sensor. This output is latched and remains low when the magnet is rotated past the Hall-effect sensor, and the magnetic flux density decreases to a level below that which is necessary to turn on the Hall-effect sensor. If an external magnet is introduced into the ignition system in order to tamper with the automobile ignition system, comparator 30 will not generate the ignition signal because the location of comparator 30 and the size of the external magnet will not cause a significant enough differential magnetic field to cause comparator 30 to generate the ignition signal. In this manner, the magnetically sensitive areas of the comparator fail to detect a difference in magnetic flux density and no ignition signal is generated.

It therefore can be seen that the present invention provides for an automobile ignition security system to prevent actuation of the ignition system when an external magnet is introduced into the ignition system. The present lock security system provides for the use of a differential magnetic comparator which is reliable and cost effective.

Whereas the present invention has been described with respect to specific embodiments thereof, it will be understood that various changes and modifications will be suggested to one skilled in the art and it is intended to encompass such changes and modifications as fall within the scope of the appended claims.

What is claimed is:

1. A lock for an automobile ignition switch comprising:

a lock sleeve defining a cylindrical inner surface;

a lock cylinder rotatably mounted within said sleeve and having a cylindrical outer surface defining a cylindrical interface with said inner surface of said sleeve, said lock cylinder having a keyway adapted for receiving a key used to rotate said cylinder between an off position and a start position;

a single differential magnetic comparator having a pair of magnetically sensitive areas mounted on said sleeve for detecting when said cylinder is rotated to the start position for generating an ignition signal; and a magnet mounted to said lock cylinder for generating a magnetic flux and for activating said comparator when said cylinder is rotated to the start position, such that a difference in magnetic flux density present on the a pair of magnetically sensitive areas causes said comparator to generate said ignition signal, and such that in the presence of a magnet external to the lock, said pair of magnetically sensitive areas detects no difference in magnetic flux density which prevents said comparator from generating said ignition signal.

2. The lock of claim 1 wherein said comparator comprises a Hall-effect device.

* * * * *